G. Radbruch.
Churn Dasher.

No. 95,514.  Patented Oct. 5, 1869.

Witnesses.
A. Hinchman
Jno. R. N. Brooks

Inventor
G. Radbruch,
per Munn & Co.
Attys.

United States Patent Office.

GUSTAV RADBRUCH, OF HOBOKEN, NEW JERSEY.

Letters Patent No. 95,514, dated October 5, 1869.

IMPROVEMENT IN CHURN-DASHERS.

The Schedule referred to in these Letters Patent and making part of the same

*To all whom it may concern:*

Be it known that I, GUSTAV RADBRUCH, of Hoboken, in the county of Hudson, and State of New Jersey, have invented a new and improved Churn-Dasher; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
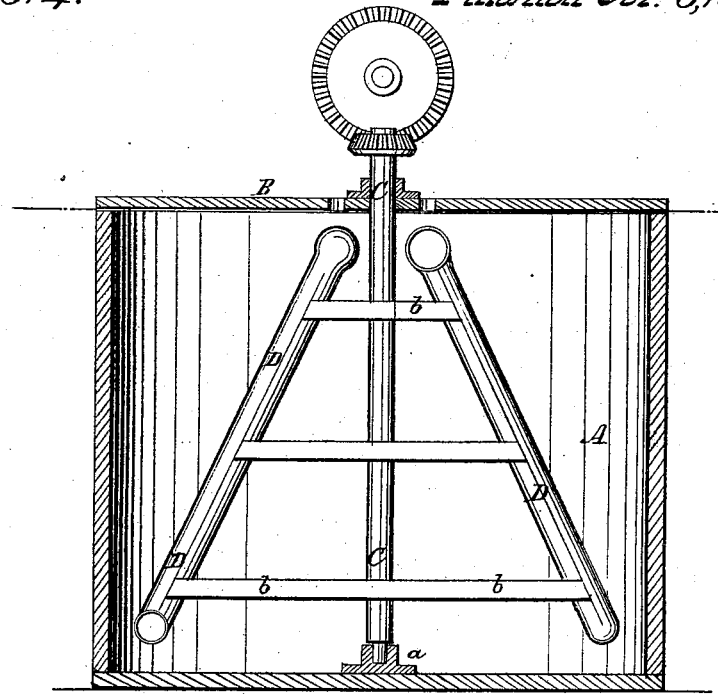
Figure 1 represents a sectional side view of my improved churn.

This invention relates to that class of churns known as atmospheric churns; and

It consists in the arrangement of the inclined tubes with relation to the dasher. These tubes are supported upon the dasher, with their upper ends nearest to the same, whereby, during their operation, their lower ends will move much faster than their upper ends, because they describe a larger circle. The suction produced at the lower ends of the pipes, as they pass through the cream, will cause the air to rush with great rapidity into the upper ends, which would not be the case were both ends of the tubes equidistant from the shaft. By my arrangement, centrifugal force is applied, by which the air in the upper ends of the pipes receives an outward motion, thus causing it to follow the direction of the pipes into the cream.

A, in the drawing, represents the vessel or churn.

B is its cover.

C is a vertical central shaft, fitted through the cover, and supported by a step, *a*, on the bottom of the churn. It can receive rotary motion by means of a crank or other suitable mechanism.

Figure 2:
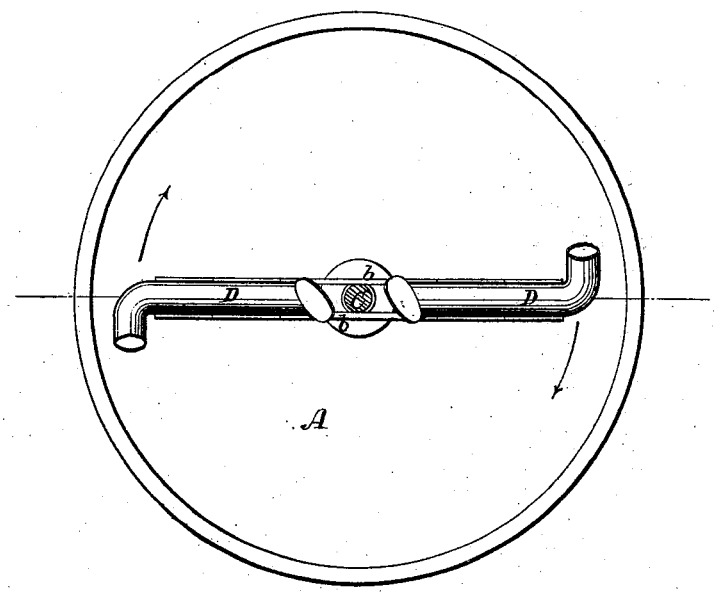
Figure 2 is a plan or top view of the same.

From the shaft C project arms or braces, *b b*, which serve to support two or more tubes, D D, which constitute the sides of the dasher, and which are, by preference, placed in inclined positions, as shown in fig. 1. The lower ends of the tubes are bent, to form knees, as shown in fig. 2.

As the shaft is revolved, the tubes D are carried around with it, and strike the cream. The shaft should be turned in the direction of the arrow, shown in fig. 2, so that the lower openings of the tubes will be drawn away from, and not pushed against the cream. The horizontal lower parts of the tubes will thus, when they are drawn through the cream, leave a vacuum in their track, which is filled by air entering through the tubes.

The cover B should be perforated, to allow air to enter the tubes D.

Having thus described my invention,

I claim as new, and desire to secure by Letters Patent—

The dasher herein described, consisting of the central shaft C, arms *b b*, and straight tubes D, the latter being inclined inwardly, from bottom to top, and having an elbow formed at their lower ends, as and for the purpose specified.

GUSTAV RADBRUCH.

Witnesses:
FRANK BLOCKLEY,
ALEX. F. ROBERTS.